(12) United States Patent
Pluvinage et al.

(10) Patent No.: US 8,118,068 B2
(45) Date of Patent: Feb. 21, 2012

(54) APPARATUS AND METHODS FOR STORING AND DISPENSING SOLID MATERIAL

(75) Inventors: Loic Pluvinage, Ville-la-Grand (FR); Antonio Valella, Le Grand-Saconnex (CH); Gian-Luigi Berini, Dardagny (CH)

(73) Assignee: Symyx Technologies Europe SA, Sunnyvale, CA (US)

( * ) Notice: Subject to any disclaimer, the term of this patent is extended or adjusted under 35 U.S.C. 154(b) by 170 days.

(21) Appl. No.: 12/613,190

(22) Filed: Nov. 5, 2009

(65) Prior Publication Data

US 2010/0051644 A1    Mar. 4, 2010

Related U.S. Application Data

(62) Division of application No. 11/131,975, filed on May 18, 2005, now Pat. No. 7,614,429.

(51) Int. Cl.
*B65B 1/04* (2006.01)

(52) U.S. Cl. ............ 141/83; 141/94; 141/193; 141/375; 222/181.1; 222/561

(58) Field of Classification Search .......... 141/5, 67, 141/83, 94, 192–193, 231, 331, 336, 340, 141/344, 375; 222/160–162, 180, 181.1, 222/181.2, 183, 460, 462, 559, 561; 117/68, 117/70
See application file for complete search history.

(56) References Cited

U.S. PATENT DOCUMENTS

| | | | |
|---|---|---|---|
| 3,662,930 A | 5/1972 | Meierhoefer | |
| 3,942,561 A | 3/1976 | Stoeffler | |
| 4,243,158 A | 1/1981 | Negosta | |
| 4,684,041 A | 8/1987 | Jones | |
| 4,867,258 A * | 9/1989 | Narukawa et al. | 141/83 |
| 4,974,646 A | 12/1990 | Martin | |
| 5,038,839 A | 8/1991 | Morimoto | |
| 5,145,009 A | 9/1992 | Mheidle | |
| 5,573,340 A | 11/1996 | Gueret | |
| 6,056,027 A | 5/2000 | Patterson | |
| 6,121,556 A | 9/2000 | Cole | |
| 6,182,712 B1 | 2/2001 | Stout | |
| 6,516,973 B2 | 2/2003 | Chrisman | |
| 6,701,977 B2 | 3/2004 | Taylor | |
| 6,805,175 B1 | 10/2004 | Pinkas et al. | |
| 6,817,593 B2 | 11/2004 | Kato | |
| 6,981,619 B2 | 1/2006 | Moretto | |
| 7,075,019 B2 | 7/2006 | Bergman | |
| 7,090,098 B2 | 8/2006 | Livingston | |
| 7,118,010 B2 | 10/2006 | Crowder | |
| 7,134,459 B2 | 11/2006 | Carlson | |
| 7,156,372 B2 | 1/2007 | Keisey | |
| 7,284,574 B2 | 10/2007 | Fontaine | |
| 2001/0027823 A1 | 10/2001 | Luchinger | |

(Continued)

FOREIGN PATENT DOCUMENTS

CA        2100046        1/1995

(Continued)

*Primary Examiner* — Gregory Huson
*Assistant Examiner* — Nicolas A Arnett

(57) ABSTRACT

The invention is directed to a dispensing unit suitable to precisely dispense material in powdery and/or granular form. The dispensing device comprises an gate valve opening sealingly closed by a blend. A control unit, which is interconnected to a scaling device, controls the opening of the gate valve opening by the position of the blend. The precise amount of the material is adjusted in relation to the signal of the scaling device.

15 Claims, 2 Drawing Sheets

U.S. PATENT DOCUMENTS

| | | |
|---|---|---|
| 2004/0155069 A1 | 8/2004 | Fontaine |
| 2005/0040185 A1 | 2/2005 | MacMichael |

FOREIGN PATENT DOCUMENTS

| | | |
|---|---|---|
| CA | 2250574 C | 12/1999 |
| EP | 0295035 A2 | 12/1988 |
| EP | 0304093 A2 | 2/1989 |
| EP | 0353197 A1 | 1/1990 |
| GB | 1488719 | 6/2008 |
| WO | 9518365 | 7/1995 |
| WO | 9705018 | 2/1997 |
| WO | 0133176 A1 | 5/2001 |
| WO | 0211800 A2 | 2/2002 |
| WO | 0229371 A1 | 4/2002 |
| WO | 0244669 A1 | 6/2002 |
| WO | 02090896 A2 | 11/2002 |
| WO | 03026965 A1 | 4/2003 |
| WO | 03066436 A1 | 8/2003 |
| WO | 03066437 A1 | 8/2003 |
| WO | 03098170 A1 | 11/2003 |
| WO | 2004030819 A2 | 4/2004 |
| WO | 2004042334 A1 | 5/2004 |
| WO | 2005002654 A2 | 1/2005 |
| WO | 2005014397 A1 | 2/2005 |

* cited by examiner

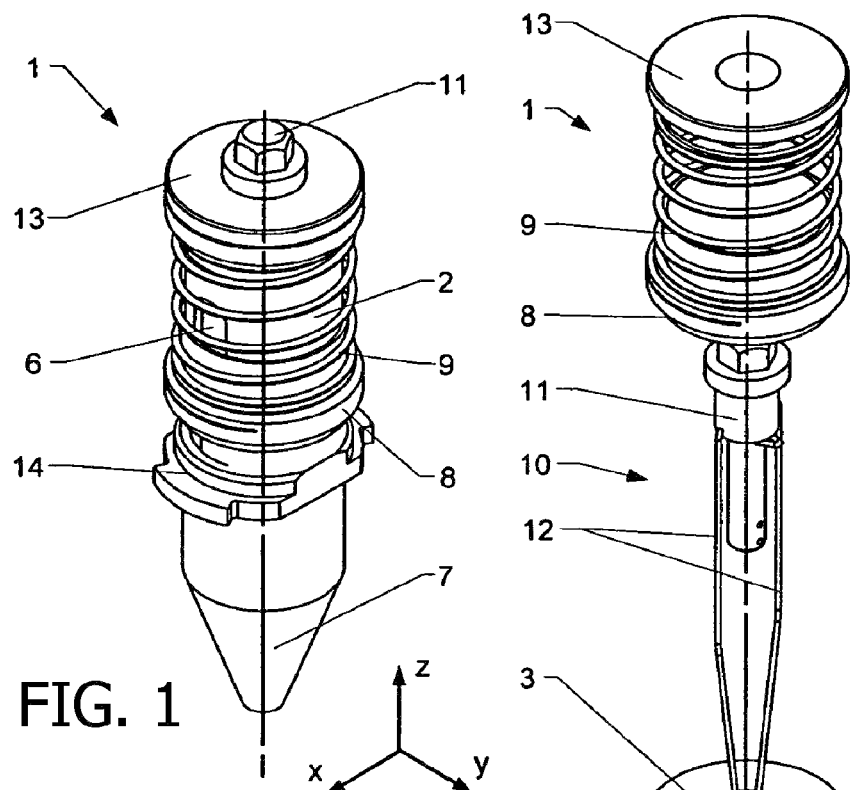
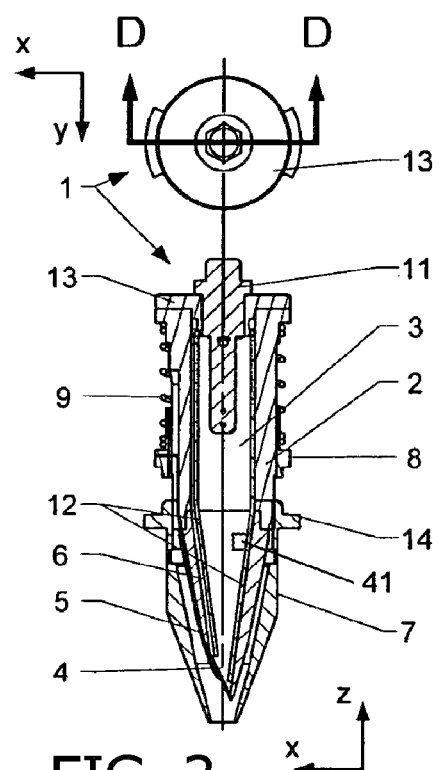
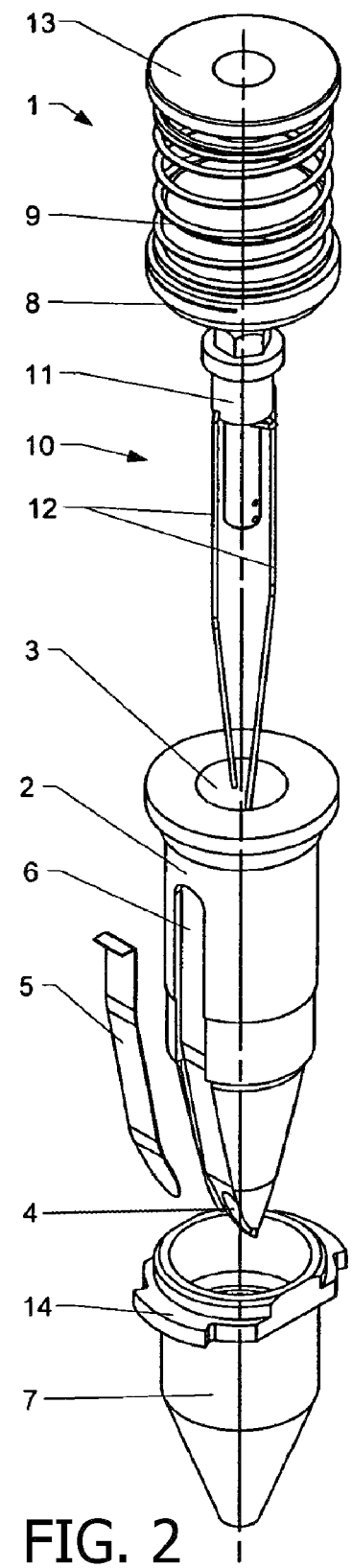
FIG. 1
FIG. 2
FIG. 3

APPARATUS AND METHODS FOR STORING AND DISPENSING SOLID MATERIAL

CROSS-REFERENCE TO RELATED APPLICATION

This application is a divisional of U.S. patent application Ser. No. 11/131,975, filed May 18, 2005, which is hereby incorporated by reference in its entirety.

FIELD OF THE INVENTION

The present invention relates to an apparatus and a method for dispensing material, especially small amounts of solid material in powdery or granular form.

BACKGROUND OF THE INVENTION

In various industries, such as the chemical and the pharmaceutical industry handling of non-liquid materials in solid or powdery form is used for preparing mixtures, drugs, tests, in-process products or final products. Several dispensers for handling powdery materials are known from prior art and it is inherent to those devices that in general they are not suitable to precisely dispense different amounts of material, especially when the amount of material to be dispensed is small (e.g. in the range of milligrams). Most important, these devices are not suitable to dispense powdery materials if the starting amount is very limited, such as e.g. 30 mg or less. However, in the chemical and the pharmaceutical industry, for research, development and production, it is important to be able to precisely dose small and very small amounts of powders and solids, with different flow characteristics and independent of the starting amount.

DESCRIPTION OF PRIOR ART

U.S. Pat. No. 5,145,009 is directed to an apparatus for metering dry and pulverulent pourable material such as dye powder in a laboratory dyeing line for textiles. The apparatus includes a discharge container which has a closable outlet in its lower region. Scales for metering the amount of material that is to be conveyed from the outlet of the container are arranged on the underside of the container. The container includes a valve body that tapers towards the top and can be displaced vertically downwards. The valve body is arranged rotatable in closed and open position having the capability for conveying the material in the direction towards the outlet opening therefore performing a dual function. One disadvantage consists in that the device is not suitable for small amounts of material.

WO02/29371 is directed to a dosing unit for releasing a powdery substance and a scale for determining the amount of substance released. The dosing unit comprises a storage container that contains the substance to be released and is mounted on a scale in such a way that the scale measures the weight of the dosing unit. As the scale measures the weight of the dosing unit including the storage container and the substance, the amount of the substance released can be determined by subtraction.

WO03/098170 discloses a device for dosing powdery substances. The device comprises a substance-receiving device which is provided with a plurality of compartments suitable to receive a substance that is to be dosed and which can be emptied individually. The device also comprises an evacuation device for emptying the compartments, a scale determining the quantity of dosed substance and means for controlling the evacuation of the compartments according to the quantity of the dosed substance.

WO2005/002654 is directed to a device for dispensing individual doses of powder from pockets of a disc-shaped carrier. The doses are dispensed by rupturing a foil by pressure on an opposite side surface. The device provides individual flow paths for each pocket. Split airstreams are allowing improved entrainment of powder and a cam mechanism is provided for outwardly rupturing the pockets. Further an indexing mechanism is linked to the cam mechanism and a dose counter.

US2005/0040185 describes an apparatus for dispensing small quantities of particles. The apparatus comprises a hopper provided with a sieve at a bottom portion thereof. The hopper defines a powder-containing zone above the sieve which in use contains powder to be dispensed therefrom through the sieve. The hopper is held by a support so that the hopper can in use be held above a container into which the dispensed powder is to be received. At least one actuator is provided for delivering impact energy to the hopper for causing powder to be dispensed through the sieve when the hopper receives the impact energy.

WO03/026965 is from the same applicant as US2005/0040185 and also describes an apparatus for dispensing small quantities of particles. The apparatus comprises a hopper provided with a sieve at a bottom portion thereof. The hopper defines a powder-containing zone above the sieve which in use contains powder to be dispensed therefrom through the sieve. The hopper is held by a support so that the hopper can in use be held above a container into which the dispensed powder is to be received. At least one actuator is provided for delivering impact energy to the hopper for causing powder to be dispensed through the sieve when the hopper receives the impact energy. The actuator is arranged to deliver impact energy to the hopper from different directions and/or at different locations on the hopper.

WO2005/014397 describes a method and an apparatus for filling a container with powder in that an outlet of a hopper containing powder is positioned above an open end of the container. The hopper is mechanically agitated so as to cause powder to be transferred from the hopper to the container. By mechanically agitating the container it is ensured that the container is filled with powder at a predetermined density.

U.S. Pat. No. 6,805,175 describes an apparatus for aspirating and dispensing powder. The apparatus comprises hopper having a powder transfer port and a suction port for connection to a source of suction to establish an upward flow of air through the transfer port. A gas flow control system varies the upward flow through the transfer port at different velocities, whereby the velocities include an aspirating velocity for aspirating powder into the hopper through the transfer port to form a fluidized bed of powder in the hopper, and a dispensing velocity less than the aspirating velocity but sufficient to maintain fluidization of the bed while allowing powder from the bed to gravitate through the transfer port for dispensing into one or more destination receptacles. A method of aspirating and dispensing powder is also disclosed.

WO02/11800 discloses a powder delivery device for the delivery of a physiologically active agent in powdered form into a patient's nasal cavity. The device comprises a bulk reservoir for containing multiple doses of powder, a powder delivery passage for the forced flow of gas with a dose of said powder entrained therein to a patient. A powder metering unit for metering out a dose of powder from said bulk reservoir is provided to align a metered dose with said gas flow passage.

WO03/066437 is directed to a method and an apparatus for introducing powder into a pocket using a dosator. The dosator includes an elongate cavity with an open end and a plunger opposite the open end moveable along the cavity so as to define a space of variable volume. The plunger defines a volume which is greater than that of the pocket. By inserting the open end of the dosator into a source of powder the volume is filled with powder. By positioning the open end over the pocket and driving the plunger the powder is expelled from the open end into the pocket and compressed to a predetermined bulk density.

US2001/0027823 discloses a dispensing apparatus for granular or powdery bulk materials. The apparatus includes a balance to weigh doses of material being dispensed, a reservoir container and a cover to close a downward-facing opening of the reservoir container. A conveying and delivering device is integrated in the cover. The conveying and delivering device has a vertically movable, rotary conveyor body designed so that it can substantially close off the dispensing outlet for the bulk material. The conveyor body has a ring-shaped bottom and a ring-shaped conveyor channel which is recessed in the cover. The outlet is arranged in the ring-shaped channel and is designed to deliver a directed and locally concentrated stream of bulk material.

WO02/090896 is directed to a powder measure-dispensing cap. The dispensing cap comprises a body with a feed opening. The feed opening is supplied by at least one endless screw.

GB1488719 describes a dispenser for dispensing liquids or powdery materials out of an aerosol container in which the liquids or powdery materials are stored together with a propellant.

CA2100046 discloses a disposable dispensing device for dispensing solid materials in powder or granular form. The dispensing device dispenses measured quantities without using a teaspoon or other separate measuring device. The device comprises a longitudinal passage and a sliding member with a substantially rectangular cross-section. The sliding member is movable from a first position to a second position such that a dispenser aperture may be opened or closed.

CA2250574 discloses a dispenser for substances in powder or granular form. The dispenser enables a multiplicity of doses of a substance in powder or granular form contained in a reservoir to be dispensed in succession. To form a dose a shaft must be rotated relative to a part of the dispenser, whereby the shaft has to be arranged substantially vertical while the dose is being formed. It is not foreseen to dispense individual amounts of materials.

U.S. Pat. No. 5,573,340 describes a device for dispensing a liquid or powdery product. This device includes a container and a stopper for sealing the container. A pouch made of an elastic substance with a slit is placed inside the neck of the container. The slit is open when a stopper seals the container. The slit closes when the stopper is removed from the container.

U.S. Pat. No. 3,662,930 is directed to a dispensing package for adding a medicine to a parental solution container which is characterized by a plug disposed between a medicament reservoir and a discharge conduit. The plug has a labyrinth through which solid medicament must pass on discharge. The function of the labyrinth is to prevent the additive powder from being spilled or misdistributed out of the package.

From the prior art devices are known wherein predetermined amounts of material are encapsulated in appropriate standardized containers or capsules of different sizes made out of an inert material such as glass. With these devices the minimum amount possible to be dispensed is given by the smallest standardized container available and a fine graduation is therefore difficult to achieve. A further disadvantage is the logistic effort necessary to produce, handle and store the different containers. Still a further disadvantage consists in that the remains of the containers have to be disposed or separated form the mixtures. Prepacked containers comprising different materials to be dispensed may be mistaken for one another. Therefore it is important that the risk of error is at least minimized if not completely avoided.

The dispensers known from prior art are not suitable for automatic dispensing of small starting amounts of materials into typically used vessels and receptacles, such as plates, vials, bottles, capsules, etc., in very low quantities, like 1 mg or less. One reason for this problem is that the known devices are too large or have too many parts involved such that, due to the large surface of the parts involved, small quantities of powder cannot be handled well by the known devices. Also, the waste of the powder caused by the known devices is considerable. Another draw back is that the devices known from prior art in general consist of a large number of parts which are difficult to manufacture, assemble, maintain and clean. A further draw back is that the devices known from prior art have to be adjusted according to the physical characteristics of the material to be dispensed or cannot be used for dispensing of cohesive powders. In addition, the known devices may lose powder during operation because they are not sufficiently sealed. Uncontrolled loss of powder may cause serious problems and contamination.

PROBLEM TO BE SOLVED

It is one object of the invention to provide a device which is suitable to precisely dispense small and very small amounts of at least one material in powdery or granular form, especially when the starting amount is limited. It is a further object of the invention to provide a device that prevents negative contamination, spilling or loss of material. It is a further object of the invention to provide a device which allows recovering remaining powder without negative loss. It is a further object of the invention to provide a device for automatically dispensing at least one material in powdery or granular form. It is still a further object to provide a device which is suitable to reduce the risk of dispensing errors.

SUMMARY OF THE INVENTION

One embodiment of the invention comprises a dispensing device which has, compared to the devices known from prior art, a simple setup suitable for being made of metal or injection molded plastic, depending on what is desired in view of the field of application. The device is easy to fill and empty without the need of extensive cleaning. A limited number of parts are in direct contact with the material to be dispensed. These parts are easy to clean and to maintain. Compared to the prior art, one advantage is that the device offers the possibility for miniaturization which facilitates handling small amounts of material. The device is further suitable for use with materials in powdery and/or granular form having different physical characteristics (e.g. particle size, shape and form, density, humidity). The device further provides a high repeating accuracy (such that it is possible to dispense thirty portions of 1 mg or sixty portions of 0.5 mg, for example) with a high accuracy using a single dispenser. Therefore the dispenser according to the present invention is especially suitable to be used in laboratories (e.g. of the pharmaceutical and biotechnological industry) and particularly for small-scale scientific research.

The device limits the risk of cross-contamination since the openings can be sufficiently sealed if necessary.

To provide a high accuracy the device preferably comprises or is interconnectable to at least one scaling means to directly or indirectly measure the amount of material dispensed. For direct measuring the scaling device is interconnected to the dispensing device itself, measuring the amount of material leaving the dispensing device. Alternatively or in addition the scaling device, for indirect measuring, is interconnected to the container determined to receive the dispensed material.

The dispensing device in general comprises at least one compartment to receive a material to be distributed, a gate valve, preferably a gate valve with variable opening, an agitator, and a conveyor. The gate valve, the agitator and the conveyor are driven by at least one drive mechanism which forms part of the dispensing device or to which the dispensing device may be interconnected by interfaces. In a preferred embodiment the agitator and the conveyor are incorporated in a single device. Depending on the field of application the dispensing device further comprises a storing means to hold information about the material contained in the dispensing device temporarily or permanently (e.g. the type of material, amount of material and condition of the material contained in the dispensing device). If appropriate the dispensing device may further comprise at least one sensor to retrieve information about the condition of the material contained in the dispenser, such as humidity, temperature or electric conductivity.

A control unit which may form part of the dispensing device or to which the dispensing device may be interconnected controls the position and opening of the gate valve, the agitator and/or the conveyor. The control unit is, if present, further interconnected to the at least one scaling means to control or double check the amount dispensed from the dispensing device. The control unit may further comprise means to read out and store information from the storing means.

In a preferred embodiment the dispensing device is designed as an exchangeable unit having a first standardized interface suitable to be interconnected with an appropriate second standardized interface of a controller. The controller is thereby suitable to receive different dispensing devices, e.g. of different size or containing different materials. When not interconnected to the controller the different dispensing devices are preferably stored in a storing unit tightly sealed. Exchanging of the dispensing devices preferably takes place by an exchanging device which is suitable to exchange the dispensing devices automatically.

Due to the large flexibility and the setup it is possible to provide an adapter means by which the dispensing device according to the present invention may be interconnected to existing control devices as known from the prior art. The adapter means is foreseen to transfer control variables and if appropriate feedback information between the dispensing device and the control device for adjusting the opening of the gate valve.

For handling small amounts of solid material, e.g. in powdery or granular form, it can be important that no needless waste and spilling of material takes place. One source of misspending with the devices known from the prior art often takes place in the area of the dispensing opening. The dispensing device according to one embodiment of the present invention therefore comprises a gate valve which solves this problem. In a general setup the dispensing device comprises a compartment for receiving a powdery material to be dispensed. The compartment comprises a tapered lower end with a gate valve dispensing opening. The dispensing opening is opened and closed by a gate acting as part of a gate valve which is arranged such that it provides only minimum contact with the material stored in the compartment in that the rim of the opening acts as a wiper for the material in contact with the gate so that the material in the compartment is not wasted. The gate is pressed firmly, e.g. by spring load, against a rim of the dispensing opening or an alternative edge such that no material may enter between the rim of the opening and the gate. Good results have been achieved by an elastic gate closing the opening from a side. The gate is guided in appropriate guiding means guaranteeing that the gate is sufficiently firmly pressed against the opening at least at one side. In a preferred embodiment the gate is a relatively thin strip of elastic material guided in at least one longitudinal slot extending radially from the opening. The strip of material is formed and arranged such that in the closed position it tightly closes the opening. The dispensing device may further comprise an agitator means to agitate the material stored in the compartment. If appropriate the gate valve and the agitator means comprise standardized interface means to facilitate exchange of one dispensing device for a similar dispensing device. The compartment of the dispensing device may be designed such that it is hermetically closable. In particular, the filling and the dispensing opening may be sealingly closed in an appropriate way to allow storing of the material within the dispensing device.

In a preferred embodiment the dispensing device comprises a compartment to receive material to be dispensed having a generally cylindrical first section which leads into a generally conical second section. At the end of the second section the compartment comprises an opening which is arranged at an angle to the longitudinal axis of the first section and the second section such that an oval shape of the opening results. The opening can be sealed by a gate valve including a gate by which the passage through the opening can be infinitely varied from fully closed to fully open. The position of the gate is adjusted by a first internal or external drive mechanism which is interconnected to the control unit. In the compartment, depending on the field of application, at least one agitator is arranged rotatable and/or movable in the direction of a centre axis activated by a second internal or external drive mechanism. The agitator is preferably suitable to interact along the full length of the compartment with the material stored in the compartment. Good results have been achieved by a long thin wire-like structure extending along the inside contour of the compartment. The agitator is suitable to mix the material stored in the compartment and may help as a conveyor means conveying the material to be dispensed through the opening at the end of the second section of the compartment. Depending on the material to be dispensed at least one further agitator may be arranged within the compartment moving in a direction similar or counter to the first conveyor. The agitator thereby is suitable to take influence on the morphology, the distribution of grain of the material to be dispensed. The position of the agitator and the gate may be read out by sensor means and the information provided to the control unit which is interconnected to the first and the second drive mechanisms. It is obvious that the shape of the compartment may be different from the shape of the compartment in the preferred embodiment as long as it does not have any negative impact onto the functionality of the device.

To dispense material out of a dispensing device according to one embodiment of the present invention in general the following steps are included a) Interconnecting the dispensing device to a control unit;

b) If necessary activating the agitator to disperse the material stored in the compartment;

c) Opening the gate valve by retracting the gate until material starts to trickle through the opening of the gate valve and measuring the amount of material which has left by the weighing means and comparing it by the predetermined total amount of material to be dispensed;

d) If necessary activating, before or after the gate valve has been opened, the conveyor means to support the trickling of the material; and e) Adjusting the position of the gate to fully closed when the predetermined amount of material to be dispensed is achieved.

One advantage of the dispensing device is that only a small number of pieces having shapes that are easy to manufacture and maintain are in direct contact with the material to be distributed. The device is designed such that it can be made in mass production as a returnable or a disposable unit. By the herein disclosed invention it becomes possible to provide to customers a prepacked set of dispensing devices containing a certain amount of repeatably used materials in powdery form. The dispensing devices may then be stored in an appropriate storing device wherefrom they may be automatically retrieved by an appropriate handling device. To dispense material the handling device interconnects the dispensing device temporarily to a controller which controls the opening of the gate valve and the movement of the agitator and/or conveyor means. A sensor means interconnected to the controller measures the amount of material passing through the gate valve. Dispensing errors are reduced in that each dispensing device may be marked by an appropriate tag, e.g. a radio frequency identification tag (RFID), which is read out by the controller before material is dispensed. Furthermore the tag may be appropriate to hold and save information from the controller about the amount of material dispensed from the dispensing device or the age of the material stored in the dispensing device. In the storing device a further reading device may be appropriate to read out information from the tags of the dispensing devices. Thereby it becomes possible to gain information about the amount and the condition of the material available on stock.

BRIEF DESCRIPTION OF THE DRAWINGS

The terms and expressions which have been employed are used as terms of description and not of limitation, and there is no intention of excluding any equivalents of the features shown and described or portions thereof in the use of such terms and expressions, but it is recognized that various modifications are possible within the scope of the invention claimed.

For a more complete understanding of the present invention, including its features and advantages, reference is now made to the detailed description of the invention, taken in conjunction with the accompanying drawings, in which:

FIG. 1 is showing a dispensing device in a perspective view;

FIG. 2 the dispensing device according to FIG. 1 in an exploded view;

FIG. 3 the dispensing device according to FIG. 1 in a section view along line DD;

DETAILED DESCRIPTION OF THE PREFERRED EMBODIMENTS

Figure 4:
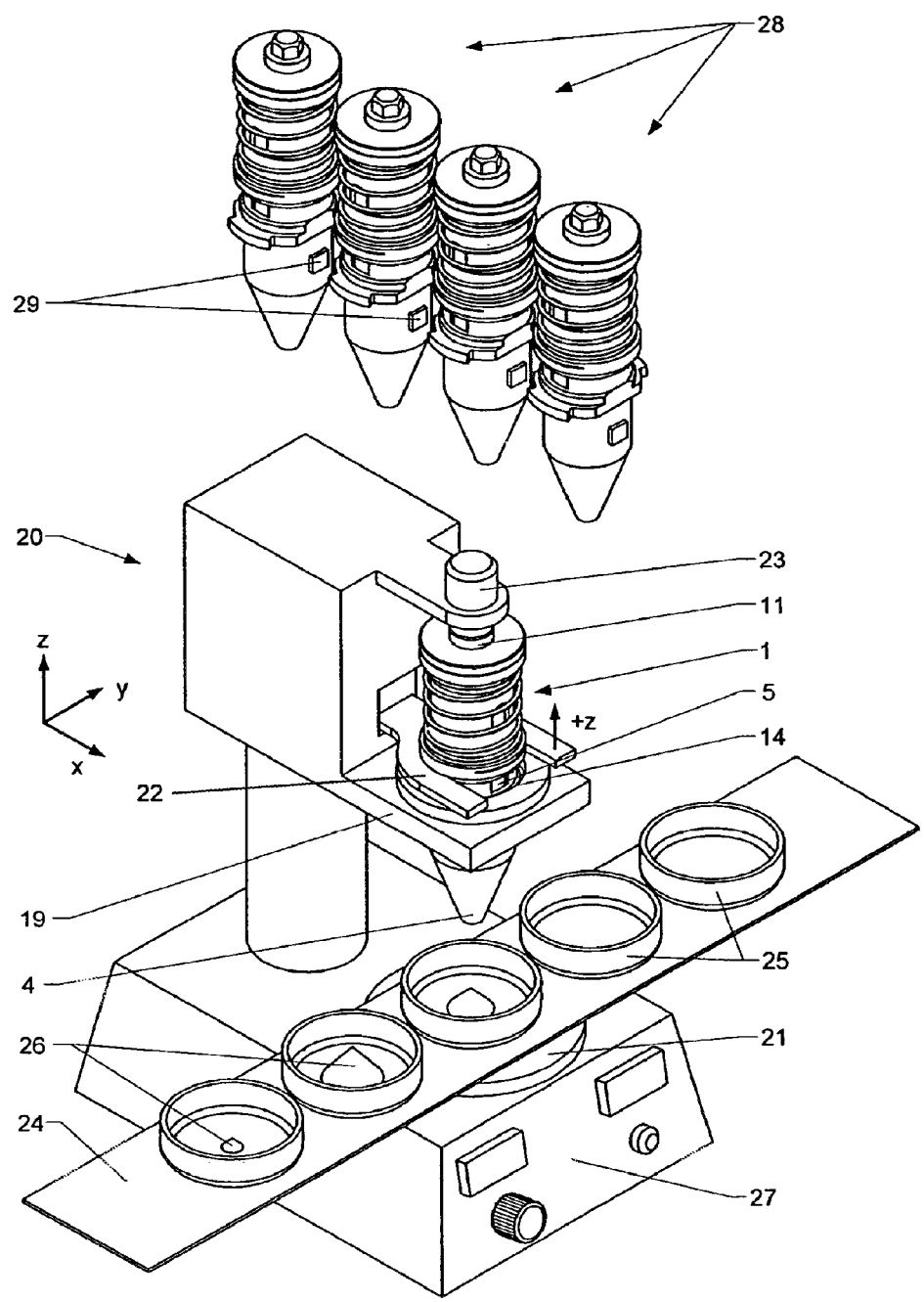
FIG. 4 a controller with a dispensing device and a rack of dispensing devices.

Reference is now made in detail to embodiments of the invention, examples of which are illustrated in the accompanying drawings.

FIG. 1 shows a dispensing device 1 in a perspective view and FIG. 2 shows the dispensing device 1 according to FIG. 1 in a disassembled manner such that the internal of the dispensing device is visible. FIG. 3 shows a section view along line DD through the dispensing device 1 illustrated in FIGS. 1 and 2.

The dispensing device 1 comprises a housing 2 surrounding a compartment 3 suitable to receive material to be dispensed. At the lower end the housing 2 is a gate valve opening 4 which is when in its closed position sealingly covered by a gate 5 which is supported by a rim of the opening 4. The gate 5 is arranged retractable in a notch 6 extending radially with respect to the opening along the outside of the housing 2. The notch 6 acts as a guiding means for the gate 5. The blade like gate 5 of the illustrated embodiment is made out of an elastic material such as spring steel or a similar material which is resiliently interacts with at least a portion of the rim of the opening 4. The gate is operable so material is not pulled between the gate 5 and the housing 2.

As it can be seen in FIGS. 2 and 3, the gate 5 has a bend and is held within the notch 6 by a sleeve 7 surrounding the lower part of the housing 2. The sleeve 7 comprises a bayonet-type interlocking device 14 (broadly, a standardized interface) by which the dispensing device 1 may be securely attached to a corresponding interlocking device of a control unit 20 (see FIGS. 3 and 4). The compartment 3 has an upper portion having a generally cylindrical shape and a lower portion having a generally tapered conical shape in the region of the gate valve opening 4 which has in the illustrated embodiment an oval shape. The dispensing device 1 has a sensor 41 adapted to retrieve information about the condition of material contained in the dispenser, such as humidity, temperature or electric conductivity. The gate 5 is at its back end interconnected to a bushing 8 arranged movably in vertical direction (z) along the outside of the first section of the housing 2. The bushing 8 and the gate 5 are held in a closed position by a spring 9 which is arranged between the bushing 8 and an upper end of the housing 2. In the closed position the opening 4 is sealingly closed by gate 5 such that no material within the compartment 3 may uncontrollably exit through the opening 4. By moving the bushing 8 along the housing 2 (+z-direction), the spring 9 is compressed and the gate 5 is retracted such that the opening 4 is opened and material contained within the compartment 3 may exit. The opening 4 may be opened infinitely variable amounts between fully closed and fully open by controlling the position of the gate 5. Because the gate is firmly pressed against the rim of the opening 4 the rim acts as a wiper for the material stored in the compartment 3 avoiding loss of material.

An agitator 10 is positioned in the compartment 3. The agitator 10 comprises a drive shaft 11 rotatable around the central axis (z-axis) of the device 1. The drive shaft 11 comprises in the illustrated embodiment two shovels 12 reaching into the compartment 3. The drive shaft 11 in the illustrated embodiment is rotatably mounted on the central axis of the device in a cover 13 which closes the rear end of the compartment 3. At its rear end the drive shaft 11 comprises a standardized interface by which the drive shaft may be interconnected to a clutch of a drive unit (see FIG. 4).

FIG. 4 shows a dispensing device 1 attached to a bracket 19 of a controller 20 by the interlocking device 14. The control unit 20 further comprises a weighing device 21, a fork 22 which acts as a first drive mechanism suitable to displace the bushing 8 of the dispensing device 1 in vertical direction (+z-direction) and thereby control the opening of the gate valve 4. The drive shaft 11 of the dispensing device is interconnected to a second drive mechanism 23 which activates the agitator and/or the conveyor unit arranged within the compartment of the dispensing device 1 for conveying the material to the opening 4. On an external conveyor unit 24 for moving containers relative to the dispensing device 1, several containers 25 are arranged in line to receive a certain amount of material 26 dispensed from the dispensing device 1. The controller 20 further comprises or is interconnected to a central processing unit (CPU) 27 which controls and triggers the first and the second drive mechanisms 22, 23 and receives and processes data from the sensors controlling the opening of the gate valve 4 and the agitator, respectively the conveyor unit within the dispensing device 1 for conveying material to the opening 4. If appropriate the CPU 27 further reads out and stores information from a tag 29 integrated in the dispensing device 1 about the material contained within the dispensing device 1. Depending on the field of application the CPU is operable to receive and process a set of instructions, e.g. in the form of a computer program, to automatically prepare predetermined amounts of materials or a mixture of materials.

In a rack (not shown in the drawings) further dispensing devices 28 are stored. The further dispensing devices hold different materials on stock and may be interconnected to the control unit 20 either manually by hand or by an automated handling system. To avoid errors, each of the dispensing devices 28 has a tag 29 which holds information about the material and the condition of the material stored in the dispensing device 28. The control unit 20 comprises means to read out and if appropriate modify the information of the tag. Thereby it is possible to significantly reduce the risk of dispensing errors.

To dispense material into a container 25 the container 25 is moved underneath the gate valve opening 4 and on the weighing device 21. In the illustrated embodiment the weighing device 21 is arranged such that it interacts with the container 25 positioned to receive the material. In addition or alternatively a weighing device is incorporated in the bracket 19 and interacts with the dispensing device 1 to measure the amount of material exiting through the gate valve opening 4. Before the material is dispensed, the at least one measuring device 21 is reset. If necessary the agitator within the compartment of the dispensing device 1 is activated by the CPU to disperse the material stored in the compartment. After that, the gate valve opening 4 is opened sufficiently by retracting the gate 5 until material starts to trickle through the opening 4. The amount of material which has left the dispensing device is determined by the weighing device 21 and the information is made available to the CPU 27 for comparison to the total amount to be delivered. If necessary the conveyor means within the dispensing unit is activated to support the trickling of the material. The opening of the gate valve 4 is adjusted by the CPU 27 by the position of the gate 5 until the opening 4 is fully closed when the predetermined amount of material to be dispensed is achieved.

What is claimed is:

1. A dispensing system for storing and dispensing at least one material in solid form, the system comprising:
   a control unit;
   a plurality of interchangeable dispensing devices, each dispensing device including (a) a housing defining a compartment for the material and an opening for dispensing the material from the device and (b) a gate moveable between a closed position in which the gate blocks the opening and an open position in which the gate allows material in the compartment to be dispensed through the opening; and
   a weighing device operable to send signals to the control unit indicative of an amount of material dispensed from the system,
   wherein the control unit has an interface and each of the interchangeable dispensing devices has a corresponding interface allowing it to be selectively and disengageably interfaced with the control unit to form an interfaced dispensing device, the movement of the gate of the interfaced dispensing device being controlled by the control unit in response, at least in part, to the signals from the weighing device, and
   wherein the housing of each dispensing device has a longitudinal axis and the gate of each dispensing device has an end, the end of the gate being moveable generally longitudinally of the housing to open and close the opening of the respective dispensing device.

2. A dispensing system as set forth in claim 1 wherein at least one of the dispensing devices comprises an agitator in the compartment, the control unit being adapted to control the agitator when the control unit is interfaced with said at least one dispensing device.

3. A dispensing system as set forth in claim 2 wherein the agitator comprises an elongate member connected to a drive mechanism, the drive mechanism being controlled by the control unit when the control unit is interfaced with said at least one dispensing device.

4. A dispensing system as set forth in claim 1 wherein contact between said at least one material in solid form and the dispensing system is limited to contact between said at least one material and the plurality of interchangeable dispensing devices.

5. A dispensing system as set forth in claim 1 wherein the weighing device is adapted to weigh a container positioned under the opening of the interfaced dispensing device.

6. A dispensing device as set forth in claim 1 wherein the plurality of dispensing devices includes a first dispensing device containing a first material in the respective compartment and a second dispensing device containing a second material in the respective compartment, the first material being different from the second material.

7. A dispensing device as set forth in claim 1 wherein the plurality of dispensing devices includes a first dispensing device having a first size and a second dispensing device having a second size, the first size being larger than the second size.

8. A dispensing device as set forth in claim 1 wherein the compartment of each dispensing device has a tapered lower section and the opening for each dispensing device is at a bottom of the respective tapered lower section.

9. A dispensing device as set forth in claim 1 wherein each of the dispensing devices comprises an information storage device readable by the control unit and operable to store information about the material in the compartment of the respective dispensing device.

10. A dispensing device as set forth in claim 9 wherein the information storage device comprises an RF ID tag.

11. A dispensing device as set forth in claim 9 wherein the stored information can be modified by the control unit.

12. A dispensing system as set forth in claim 1 wherein the end of the gate of each dispensing device is interconnected to a bushing that is moveable generally longitudinally of the respective housing.

13. A dispensing system as set forth in claim 1 wherein the opening of each dispensing device extends generally laterally outward with respect to the longitudinal axis of the respective housing.

14. A dispensing system as set forth in claim 1 wherein each dispensing device further comprises a biasing member biasing the respective gate toward its closed position.

15. A dispensing system as set forth in claim 1 wherein each dispensing device comprises a sensor for sensing information about a condition of the material in the compartment of the dispensing device.

\* \* \* \* \*